US006801495B1

(12) United States Patent
Faruque et al.

(10) Patent No.: US 6,801,495 B1
(45) Date of Patent: *Oct. 5, 2004

(54) HIGH CAPACITY ROBUST MODEM FOR MULTIPLE CLASSES OF SERVICES

(75) Inventors: Saleh Faruque, Plano, TX (US); Fereidoun Homayoun, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/514,932

(22) Filed: Feb. 28, 2000

(51) Int. Cl.$^7$ .............................................. H04J 11/00
(52) U.S. Cl. ...................................... 370/208; 375/222
(58) Field of Search ................................ 370/208, 209, 370/268, 335, 342, 441, 479, 493, 494, 495, 206; 375/134, 137, 222

(56) References Cited

U.S. PATENT DOCUMENTS

| 4,644,560 | A | * | 2/1987 | Torre et al. ..................... 375/1 |
| 5,453,987 | A | * | 9/1995 | Tran ........................... 370/447 |
| 5,757,767 | A | * | 5/1998 | Zehavi ........................ 370/208 |
| 5,920,552 | A | | 7/1999 | Allpress et al. ............. 370/335 |
| 5,991,285 | A | * | 11/1999 | Ghosh ......................... 370/335 |
| 6,141,356 | A | * | 10/2000 | Gorman ....................... 370/493 |
| 6,192,070 | B1 | * | 2/2001 | Poon et al. ................... 375/222 |
| 6,208,615 | B1 | * | 3/2001 | Faruque et al. ............. 370/209 |
| 6,381,211 | B1 | * | 4/2002 | Lysejko et al. ............. 370/209 |
| 6,396,822 | B1 | * | 5/2002 | Sun et al. .................... 370/335 |
| 6,526,281 | B1 | * | 2/2003 | Gorsuch et al. ............ 455/452 |
| 6,647,059 | B1 | * | 11/2003 | Faruque ....................... 375/222 |

FOREIGN PATENT DOCUMENTS

| EP | 0 632 611 A2 | 6/1994 | ............ H04J/13/00 |
| WO | WO 96/36132 | 5/1996 | ............ H04B/1/707 |
| WO | WO 98/32263 | 12/1997 | ............ H04L/12/00 |

OTHER PUBLICATIONS

Application No. 60/153,622, filed Sep. 13, 1999, entitled: Call Control Server Selection with Load Sharing Mechanisms by Glenn Morrow, copy of first page of specification, abstract and figure No. one.
International Search Report dated Apr. 20, 2001.

* cited by examiner

*Primary Examiner*—Chau Nguyen
*Assistant Examiner*—Duc Duong
(74) *Attorney, Agent, or Firm*—Haynes and Boone, LLP

(57) ABSTRACT

A low-cost data communication system and method using modems to provide high speed multi-class services to subscribers is disclosed. In the present invention, an n-bit orthogonal modulating code is uniquely partitioned into several subsets whereas each subset is assigned to a particular class of services. When data streams from different classes of services go through an encoding modem equipped with the partitioned orthogonal codes, they can be split based on their classes, encoded, modulated through a multilevel phase modulation simultaneously. Thereafter, since the encoded streams are orthogonal to each other, they can be combined as a composite modulated outgoing data stream and transmitted through a wired communication channel such as a cable or optical fiber channel. At a receiving end, a decoding modem can receive the encoding scheme from the encoding modem, and appropriately decode the transmitted information. This method enables sharing the same communication channel by multiple classes of services and processing different classes of information separately but simultaneously, and thus enhancing the overall performance of the shared communication channel.

21 Claims, 2 Drawing Sheets

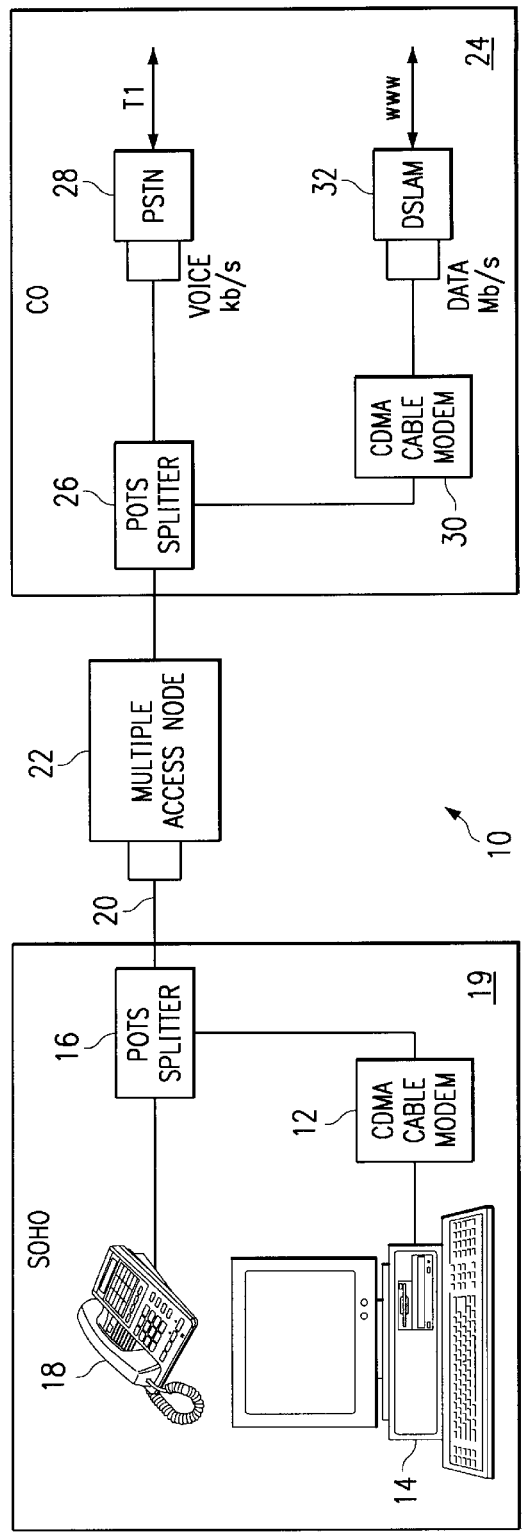
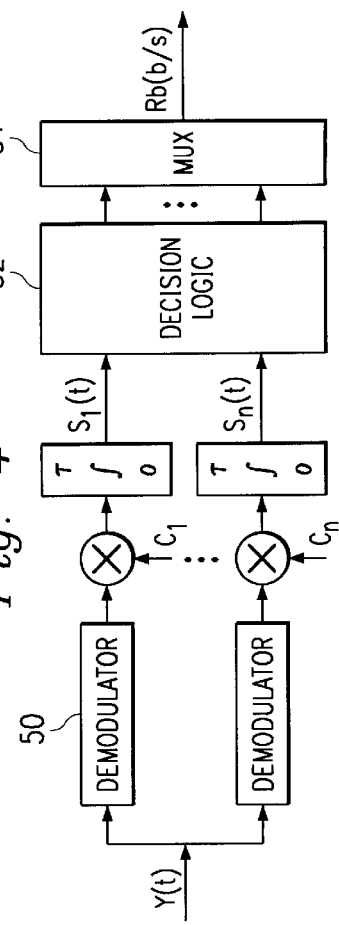
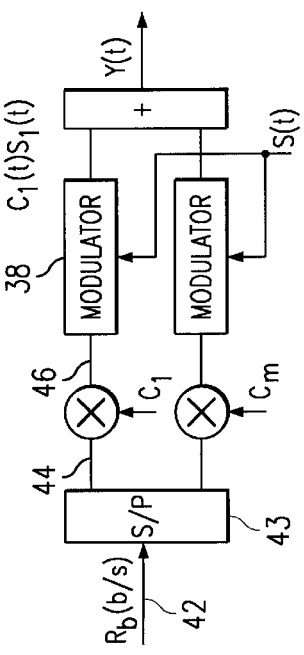

HIGH CAPACITY ROBUST MODEM FOR MULTIPLE CLASSES OF SERVICES

CROSS REFERENCE

This application relates to U.S. application Ser. No. 09/455,090, which was filed on Dec. 6, 1999 and is herein incorporated by reference.

BACKGROUND OF THE INVENTION

The present invention relates generally to telecommunication networks, and more particularly, to a system and method for providing a high-speed, high capacity communication channel supporting a wide range of services.

In the modern telecommunication industry, improved technologies for transmitting information through an efficient medium are always needed. Technologies for fast data transmission keep evolving at a rapid pace. For the wired world, modems are still one of the key instruments for users to exchange information in a computer network. However, modems in general suffer from numerous performance degradations. For example, current dial-up modems are limited to a speed of about 56 kb/s using data compression technology. Moreover, in order not to sacrifice the accuracy of the information being transmitted, a Forward Error Correction Code (FECC) technique must be implemented to embed sufficient redundant information in the transmitted data, which inevitably reduces the overall data bandwidth.

For an Asymmetric Digital Subscriber Line (ADSL) modem, the current technology provides a transmission speed about 1.5 Mb/s for up stream data flow, and up to 9 Mb/s for down stream data flow. It may be noted that ADSL technology can support simultaneous voice and data exchange over a same phone line where a user can make a plain old phone service (POTS) call while simultaneously accessing a computer network through the ADSL technology.

Although ADSL technology offers high-speed data communications over standard phone lines and achieves bandwidth efficiency, it is at the expense of using a complex data compression technology such as Trellis Coded Modulation. The complexity of such coding technology inevitably increases packet loss rate, and thus in turn damages the integrity of the data transmitted.

The real potential of modem technology lies in the opportunities driven by multimedia applications required by today's computer network users, quality and reliability performance, and the cost of such technology. More importantly, a winning technology is needed to support a range of services on a single platform, having scalability to suit different groups of users, and providing end-to-end error free services for mission critical applications.

Hence, the existing ADSL technology is thus not the ideal solution for low cost high speed information communication with multiple classes of services.

SUMMARY OF THE INVENTION

In the present invention, a system and method for providing a high-speed, high capacity communication channel supporting a wide range of services is disclosed. In one embodiment of the present invention, the system contains a set of multiple access nodes connected to both a transmitting end and a receiving end providing services to multiple users simultaneously operating on data, audio, video or multimedia communications. The system on the transmitting end includes an encoding modem whereby an encoding process is done. An incoming information stream is first divided into parallel first level sub streams based on their classes. For example, audio, video and data information are separated into three sub streams, and each of them is further divided into multiple second level sub streams. A set of unique orthogonal short-codes assigned to a given class is provided according to a predetermined code plan for encoding the information. The encoded information is then modulated by a bank of modulators, and thereafter, combined and transmitted through a shared wired communication channel such as a cable or optical fiber.

The system also has a multiple access node connected to one or more users or subscribers. The multiple access node manages to allow different users to share a single communication link and the same set of orthogonal codes by implementing a Code Sense Multiple Access Protocol. Using this protocol, each user can monitor available orthogonal codes at any given instant, and thus maximizes the use of the full set of the orthogonal code chosen by the code plan.

At the receiving end, the system may also include a decoding modem that can easily decode information encoded and transmitted by the encoding modem.

BRIEF DESCRIPTION OF THE DRAWINGS

FIG. 1 is a schematic for one embodiment of a communication system implemented with a set of modems and multiple access nodes in accordance with the present invention.

FIG. 3 shows a detailed schematic of an encoding modem of the communication system of FIG. 1 for processing a class of services according to one embodiment of the present invention.

FIG. 4 is a schematic illustrating an information decoding process in a decoding modem according to one embodiment of the present invention.

DESCRIPTION OF THE PREFERRED EMBODIMENT

Figure 2:
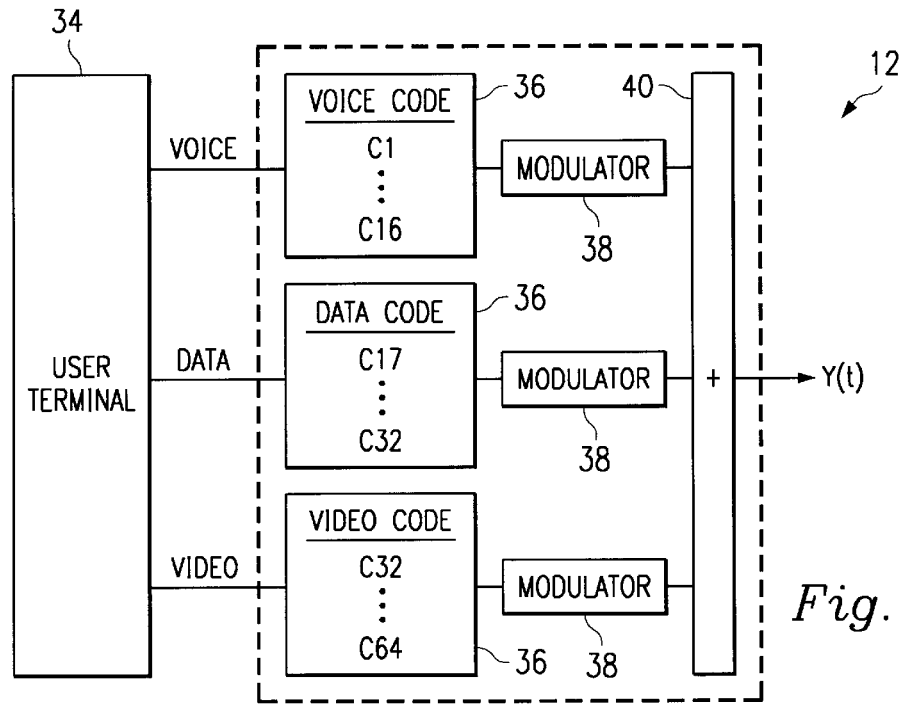
FIG. 2 is a schematic of an encoding modem of the communication system of FIG. 1 according to one embodiment of the present invention.

Referring now to FIG. 1, a schematic for a communication system 10 implemented with a set of encoding and decoding modems and a multiple access node is shown. An encoding modem 12 connects an information source such as a computer 14 to a Plain Old Telephone Service (POTS) splitter 16. The POTS splitter 16 also connects to a traditional telephone source 18. The POTS splitter 16 basically splits the transmission of received information based on their different frequencies. Thus the isolation or separation between low frequency traditional telephone transmitted information and information transmitted at a high frequency is maintained by the POTS splitter 16, which effectively prevents signal interferences. The POTS Splitter 16, the encoding modem, the communication means used by a user such as a telephone and a computer can be parts of a single Small-Office-Home-Office (SOHO) 19. Through a wired connection such as a phone line or a cable line 20, information from one or more SOHOs is sent to a multiple access node (MAN) 22. Without requiring additional telephone lines, the MAN 22 is responsible for servicing simultaneously multiple SOHOs/users operating on multiple classes of services. For illustration purposes, the SOHO/users are deemed to be on the transmission end although they can receive information as well.

On the receiving end, such as a Central Office (CO) 24, there is a POTS splitter 26. The POTS splitter 26 directs the received information to a corresponding processor circuit such as a Public Switch Telephone Network (PSTN) 28 or a decoding modem 30, which has the ability to decode the information encoded by the encoding modem 12. The decoded information may be further transmitted through a Digital Subscriber Line Access Multiplexer (DSLAM) 32 to other communication nodes.

Referring to FIG. 2, in the encoding modem 12, an encoding mechanism is implemented by using a predetermined n-bit orthogonal code. It is understood that a n-bit orthogonal code typically refers to a set of "n" number of orthogonal codes having a length of "n" bit. Taking a 64-bit orthogonal code as an example, it is known that it has a set of 64 orthogonal codes each having a length of 64 bits. In one embodiment of the present invention, the code is partitioned into several subsets, and each subset is assigned to a different class of services according to a pre-determined code plan. In one embodiment, the orthogonal code is 64-bits wide and partitioned into three subsets:

Voice (C1–C16) as subset-1

Data (C17–C32) as subset-2

Video.(C33–C64) as subset-3

Since the subsets are orthogonal to each other, information encoded by one of the three subsets does not interfere with the others. This mechanism enables a user terminal 34 to encode and transmit audio, data and video data simultaneously over the same transmission line.

The modem architecture is based on a combination of parallel signal processing, orthogonal coding and modulation, all in one platform. Depending on the classes of incoming information from the user terminal 34, the incoming information stream is divided into three first level sub streams, each being directed to a predetermined orthogonal coding process 36. It is understood that information of different classes, e. g., voice, data, and video, can be readily identified. For example, a header section of the packets can include identification of different classes of information so that they can be divided and directed to be encoded with different subsets of the orthogonal code. The first stream of voice information will be encoded by code C1 to C16, the second stream of data information by code C17 to C32, and the third stream of video information by code C33 to C64. Thereafter, the three encoded information streams are modulated separately but simultaneously through modulators 38. A combiner 40 merges all these sub streams of encoded and modulated data as one composite outgoing information stream.

FIG. 3 further illustrates the encoding mechanism of FIG. 2 and shows a detailed schems for encoding a given class of service. In this scheme, the incoming information stream 42 having a certain data transmission rate $R_b$ b/s, which represents a single class of information, e.g., voice, data, or video, is further divided into a plurality of parallel second level sub streams 44. Each of these second level sub streams is further mapped into a unique subset of the selected n-bit orthogonal code, $c_1(t), c_2(t), \ldots, c_m(t)$, which are specifically assigned to the given class.

After the encoding process, identical and parallel modulators 38 subsequently modulate each coded stream 46 to obtain, $$c_1(t)s_1(t), c_2(t)s_2(t), \ldots, c_n(t)s_n(t) \tag{1}$$

where $$S_i(t) = A(t)\cos[\omega(t) + \phi^i(t)] \tag{2}$$

is the respective modulating signal.

Since each modulated signal stream is now in the orthogonal space, they can be combined and expressed as a linear combination Y(t) of n non-interfering signals, wherein $$Y(t) = c_1(t)s_1(t) + c_2(t)s_2(t) + \ldots + c_n(t)s_n(t) \tag{3}$$

and Y(t) is transmitted through a communication channel.

For the encoding process, a series of Read Only Memory (ROMs) can be used as described in the U.S. patent application Ser. No. 09/455,090. For instance, once the splitter 43 divides the incoming data stream $R_b$ 42 into sixteen (16) sub streams 44, wherein every four sub streams may be fed into a ROM. Since the input is four (4) bits to the ROM, the ROM has to be a n×16 matrix whereas four input bits select a unique output of a predetermined length of n bits. In this example, the length of each row in the ROM can be set at 64 bits. Therefore, the ROM is a 64×16 ROM and it requires four (4) such ROMs to process the entire incoming data stream. The output of each ROM, which is a unique 64-bit orthogonal or antipodal code, will be modulated in a corresponding modulator 38. Then, the sub streams are combined again and the aggregate output Y(t) is transmitted through a cable or fiber optical channel.

From the illustration above, it is clear that an incoming data bit rate bears the following mathematical relation with the outgoing data bit rate:

$$R_b * N/K = R_{out} \tag{4}$$

and $$K = \log M/\log 2 \tag{5}$$

wherein $R_b$ is the bit rate for the incoming data, N is the length of the selected orthogonal code, and M is a binary number greater or equal to 2. Once the bit rate for an outgoing information stream is chosen by a user, the user may further decide on the length of the orthogonal code that is needed for the encoding process, which in turn decides the value of K. The number of sub streams of the incoming data and the column size of the ROMs used can then be decided accordingly.

Referring to FIG. 4, on the receiving end, e.g., inside the CO 24, the receiver architecture may be a simple correlation receiver. Here the output of each demodulator 50 is simultaneously multiplied by the respective orthogonal code to yield, $$s_1(t) = c_1^2(t)s_1(t) + c_1(t)c_2(t)s_2(t) + \ldots, c_1(t)c_n(t)s_n(t)$$

$$s_2(t) = c_2(t)c_1(t)s_1(t) + c_2^2(t)s_2(t) + \ldots, c_2(t)c_n(t)s_n(t)$$

$$\ldots$$

$$s_n(t) = c_n(t)c_1(t)s_1(t) + c_n(t)c_2(t) + \ldots, c_n^2(t)s_n(t) \tag{6}$$

Since the transmission of information between the SOHO and the CO is through a wired communication link such as a cable line, there is no multi-path components generated by the transmission. Knowing information about both an auto correlation and a cross correlation, and through a decision logic block 52 and a multiplexer 54, the transmitted information $R_b$ can be retrieved. The auto correlation and cross correlation information can be expressed in equations shown below:

$$\int_0^T c^2 i(t) = 1 \quad \text{(Auto Correlation)} \tag{7}$$

$$\int_0^T c_i(t) c_j(t) = 0 \text{ for } i \neq j \quad \text{(Cross Correlation)}$$

Figure 5:
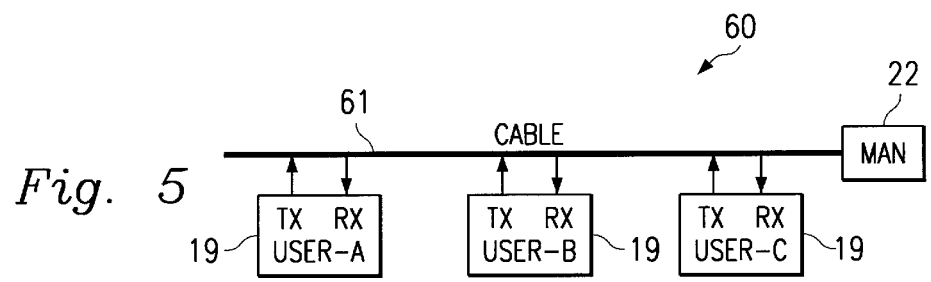
FIG. 5 is a schematic illustrating one or more users and a multiple access node connected through a shared communication channel.

Referring o FIG. 5, in order to allow multiple users to share the same communication channel such as a phone line and the encoding mechanism described above without external assistance or resource management, a Code Sense Multiple Access Protocol (CSMAP) is implemented. Reference numeral 60 designates one embodiment of a multiple access scheme. In this embodiment, the MAN 22 is connected to one or more SOHOs/users (represented by User-A, User-B), and User-C, through one single cable line 61. By using the CSMAP protocol, each User continuously monitors the presence of the orthogonal codes currently in use by other Users under the control of the same MAN 22. Since each User is connected to the same communication channel, and each User can be equipped with a correlation receiver, when User-A delivers a packet of data over the cable, User-B and User-C receive the same packet and determine which code is in use by User-A. In this manner, all Users connected to the same MAN 22 are able to continuously update a list of orthogonal codes that are available at any instance. Consequently, a User can automatically select an available orthogonal code at the beginning of the encoding process. Various collision protection mechanisms can be implemented to avoid the situation in which two Users accidentally try to use the same orthogonal code.

Figure 6:
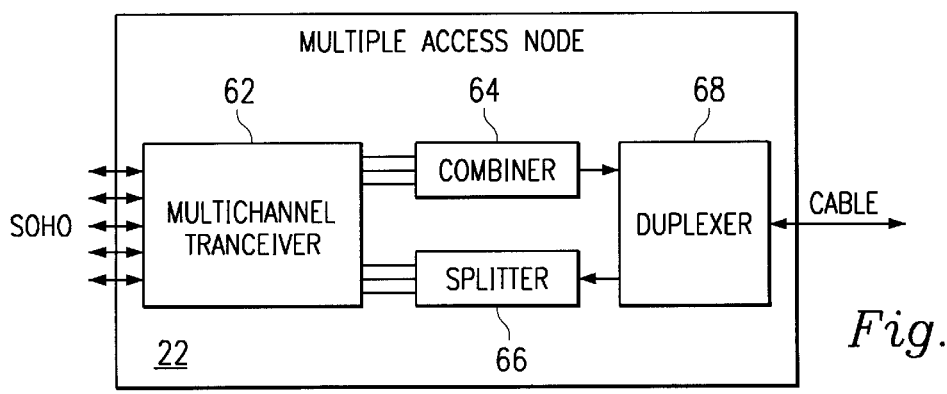
FIG. 6 illustrates a detailed schematic of a multiple access node of FIG. 1.

Referring to FIG. 6, the MAN 22, which allows the multiple classes of services to be performed on a shared communication channel is shown. The MAN 22 includes a multiple channel transceiver 62 for receiving and transmitting information, a combiner 64 for combining information received from multiple users, a splitter 66 for splitting received composite information, and a duplexer 68 for maintaining isolation between the transmitting and the receiving frequencies. One or more SOHOs/users are connected to the multiple transceiver 62, and the duplexer 68 is connected to the outgoing cable or telephone wire. The MAN 22 is a stand-alone full-duplex communication device that supports multiple users. As a choice of design, the MAN 22 can be located in a neighborhood, or a multi-unit dwelling, or other suitable areas.

The above disclosure provides many different embodiments, or examples, for implementing different features of the invention. Techniques and requirements that are specific to certain embodiments may be imported into other embodiments. Also, specific examples of components and processes are described to help clarify the invention. These are, of course, merely examples and are not intended to limit the invention from that described in the claims. For example, the present invention is not limited to a particular encoding technology, and any other similar encoding technology may be implemented as well.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for providing one or more classes of communication services for one or more users through a shared wired communication channel, the users being connected to the communication channel via a multiple access node, the method comprising the steps of:

orthogonally encoding an incoming information stream sent by each user by an encoding modem using a multi-class encoding process;

wherein the step of orthogonally encoding further includes the steps of splitting the incoming information stream into one or more classes, each class representing a first level sub stream of information; dividing each first level sub stream into a plurality of second level sub streams of information; encoding the second level sub streams with a predetermined set of orthogonal codes according to a predetermined code plan; modulating each encoded sub stream by a modulating signal; and combining the modulated sub streams into one fully encoded data stream; and transmitting the encoded information through the multiple access node to the shared wired communication channel;

wherein the multi-class encoding process is implemented according to the predetermined code plan designating specific orthogonal codes for each class of communication service.

2. The method of claim 1 wherein the step of encoding uses at least one Read Only Memory for processing the second level sub streams of information.

3. The method of claim 1 wherein the predetermined code plan partitions a selected n-bit orthogonal code into one or more subsets of orthogonal codes, wherein each subset is used for encoding a class of information.

4. The method of claim 3 wherein a code sense multiple access protocol is implemented so that the users can instantly monitor an available orthogonal code.

5. The method of claim 1 wherein the classes of information are audio information, video information, and data information.

6. The method of claim 1 further includes the steps of:

demodulating the encoded data; and extracting the encoded data based on a predetermined encoding scheme providing the encoding modem, wherein the steps of demodulating and extracting are performed in a decoding modem.

7. The method of claim 1 wherein the multiple access node includes a multichannel transceiver, a combiner, a splitter, and a duplexer.

8. A method for efficient information communication between a transmitting end and a receiving end through a wired communication channel shared by one or more users connected to the transmitting end, the information including one or more classes of information, the method comprising the steps of:

splitting an incoming information stream at the transmitting end into one or more classes of information, each class being a first level sub stream of information, the classes including audio information, video information, and data information;

dividing each first level sub stream of information into a plurality of second level sub streams of information;

orthogonally encoding each of the second level sub streams of information by an available orthogonal code according to a predetermined code plan; and transmitting the encoded streams of information as one outgoing information stream from the transmitting end to the receiving end via the wired communication channel; and decoding the encoded streams at the receiving end, wherein the predetermined code plan designates orthogonal codes servicing each class of information for preventing interferences and providing efficient use of the communication channel.

9. The method of claim 8 further includes the steps of:

modulating each second level sub stream by a modulating signal; and combining the modulated sub streams into one outgoing encoded information stream.

10. The method of claim 8 wherein the step of orthogonally encoding uses at least one Read Only Memory for processing the second level sub streams of information.

11. The method of claim 8 wherein the predetermined code plan partitions a selected n-bit orthogonal code into one or more subsets of orthogonal codes, wherein each subset is used for encoding a class of information.

12. The method of claim 8 wherein the transmitting end connects to the communication channel via a multiple access node.

13. The method of claim 8 wherein each user connected to the transmitting end implements a code sense multiple access protocol for monitoring an available orthogonal code for encoding purpose.

14. The method of claim 8 wherein the step of decoding further includes the steps of:

demodulating the encoded data; and extracting the encoded data based on a predetermined encoding scheme provided by the encoding modem.

15. A system for providing one or more classes of communication services for one or more users through a shared wired communication channel, the users being connected to the communication channel via a multiple access node, the system comprising:

means for orthogonally encoding an incoming information stream sent by each user by an encoding modem using a multi-class encoding process;

means for splitting the incoming information stream into one or more classes, each class representing a first level sub stream of information;

means for dividing each first level sub stream into a plurality of second level sub streams of information;

means for encoding the second level sub streams with a predetermined set of orthogonal codes according to a predetermined code plan;

a modulator for modulating each encoded sub stream by a modulating signal;

means for combining the modulated sub streams into one fully encoded outgoing information stream; and means for transmitting the encoded information through the multiple access node to the shared wired communication channel, wherein the multi-class encoding process is implemented according to the predetermined code plan designating specific orthogonal codes for each class of communication service.

16. The system of claim 15 wherein the means for encoding uses at least one Read Only Memory for processing the second level sub streams of information.

17. The system of claim 15 wherein the predetermined code plan partitions a selected n-bit orthogonal code into one or more subsets of orthogonal codes, wherein each subset is used for encoding a class of information.

18. The system of claim 17 wherein a code sense multiple access protocol is implemented whereby the users can instantly monitor available orthogonal codes.

19. The system of claim 15 wherein the classes of information are audio information, video information, and data information.

20. The system of claim 15 further includes the means for:

demodulating the encoded data; and extracting the encoded data based on a predetermined encoding scheme provided by the encoding modem, wherein the means for demodulating and extracting are done in a decoding modem.

21. The system of claim 15 wherein the multiple access node includes a multichannel transceiver, a combiner, a splitter and a duplexer.

* * * * *